(12) United States Patent
Lao et al.

(10) Patent No.: US 8,897,153 B2
(45) Date of Patent: Nov. 25, 2014

(54) METHOD AND BASE STATION FOR COMBINED ADJUSTING DOWNLINK AMC AND MIMO MODE

(75) Inventors: Lijuan Lao, Guangdong Province (CN); Guang Liu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 393 days.

(21) Appl. No.: 13/258,616

(22) PCT Filed: Jun. 8, 2010

(86) PCT No.: PCT/CN2010/073684
§ 371 (c)(1),
(2), (4) Date: Dec. 17, 2011

(87) PCT Pub. No.: WO2011/015081
PCT Pub. Date: Feb. 10, 2011

(65) Prior Publication Data
US 2012/0120825 A1    May 17, 2012

(30) Foreign Application Priority Data

Aug. 6, 2009    (CN) .......................... 2009 1 0165601

(51) Int. Cl.
*G01R 31/08* (2006.01)
*H04L 1/06* (2006.01)
*H04L 1/20* (2006.01)
*H04B 7/04* (2006.01)
*H04L 1/00* (2006.01)

(52) U.S. Cl.
CPC ............ *H04B 7/0417* (2013.01); *H04L 1/0618* (2013.01); *H04L 1/20* (2013.01); *H04L 1/0016* (2013.01)
USPC .......................................... 370/252; 370/328

(58) Field of Classification Search
USPC .......................... 370/252, 328, 329, 338, 465
See application file for complete search history.

(56) References Cited

U.S. PATENT DOCUMENTS 7,480,341 B2 *  1/2009  Jeong et al. .................... 375/267
7,505,397 B2 *  3/2009  Lee et al. ....................... 370/208

(Continued)

FOREIGN PATENT DOCUMENTS

| CN | 101009507 A | 8/2007 |
| CN | 101150344 A | 3/2008 |
| CN | 101379748 A | 3/2009 |

OTHER PUBLICATIONS

Ma, Nan et al., Key Technologies for Wireless Metropolitan Area Network, ZTE Communications Technology, Apr. 2005.

(Continued)

*Primary Examiner* — Ricky Ngo
*Assistant Examiner* — Christine Ng
(74) *Attorney, Agent, or Firm* — Ling Wu; Stephen Yang; Ling and Yang Intellectual Property LLC

(57) ABSTRACT

A method and base station for jointly adjusting downlink AMC and MIMO modes. The base station comprises an AMC module, a fast feedback module and a joint adjustment module. The method comprises: a base station determining the current maximum available Downlink Interval Usage Code (DIUC) using a downlink Carrier to Interference plus Noise ratio (CINR) fed back by a terminal, using a MIMO mode fed back by the terminal to determine the current channel condition, and jointly adjusting the current MIMO mode and the DIUC of the terminal within the maximum available DIUC range according to the current channel condition. The method and base station overcome the shortcoming of adjusting MIMO modes or DIUCs separately, and provide more combinations of the MIMO modes and DIUCs to maximize spectral utilization and data transmission rate, thereby achieving ultimately the purpose of improving link reliability and system throughput.

12 Claims, 3 Drawing Sheets

(56) References Cited

U.S. PATENT DOCUMENTS

| | | | |
|---|---|---|---|
| 7,702,029 B2* | 4/2010 | Kotecha et al. | 375/267 |
| 8,009,754 B2* | 8/2011 | She et al. | 375/267 |
| 8,077,809 B2* | 12/2011 | Jin et al. | 375/341 |
| 8,107,888 B2* | 1/2012 | Dinan et al. | 455/69 |
| 8,144,796 B2* | 3/2012 | Shin et al. | 375/267 |
| 8,160,601 B2* | 4/2012 | Veselinovic et al. | 455/452.2 |
| 8,345,641 B2* | 1/2013 | Yokoyama | 370/336 |
| 2006/0153227 A1* | 7/2006 | Hwang et al. | 370/465 |
| 2007/0117570 A1* | 5/2007 | Noh et al. | 455/452.2 |
| 2010/0080176 A1* | 4/2010 | Maas et al. | 370/329 |
| 2011/0044356 A1* | 2/2011 | Hadad et al. | 370/480 |

OTHER PUBLICATIONS

International Search Report for PCT/CN2010/073684 dated Aug. 17, 2010.

* cited by examiner

METHOD AND BASE STATION FOR COMBINED ADJUSTING DOWNLINK AMC AND MIMO MODE

TECHNICAL FIELD

The present invention relates to the mobile communication technology, and more particularly, to a method and a base station for adjusting downlink Adaptive Modulation and Coding (AMC) and Multiple Input and Multiple Output (MIMO) modes.

BACKGROUND OF THE RELATED ART

The MIMO technology, which is a technology in which a transmitter/receiver uses multiple antennas to transmit/receive information, is a research hotspot of the multiple antenna technology in the field of wireless mobile antenna and is also one of key technologies which must be used in the next generation mobile communication system. This technology uses multiple paths to fight back various random fading in channels, effectively avoiding co-channel interference and improving channel quality, thus improving network reliability and communication service quality. By using space resources, theoretically, system capacity and spectral efficiency may be multiplied several times without consuming additional air interface resources (time, frequency).

The MIMO technology mainly includes two applications: diversity Space Time Coding (STC) and Spatial Multiplexing (SM), where the diversity STC includes transmit diversity and receive diversity.

The diversity STC technology takes advantage of time and space simultaneously and enhances diversity gain and coding gain without increasing system capacity, its principle is shown as FIG. 1. It can be seen from FIG. 1 that input characters, that is, information sources, are divided into two groups, each group comprising two characters. In the first character time, two characters [C1, C2] in each group are transmitted from two antennas simultaneously, and in the next character time, the two characters are transformed into [−C2*, C1*] and transmitted from the two antennas again. Therefore, a receiving antenna can receive two different forms of two characters within the two character times. Compared with the case where only one form of two characters are received in the two character times, the correctness rate of characters restored using the decoding technology is greatly improved, it is shown that bit error rate is lowered and link reliability is increased, further increasing signal coverage area. When the coverage area is invariant and the user requirement of the bit error rate is constant, the diversity gain may be turned into increase of data transmission rate, for example, using a higher modulation and coding mode.

The SM technology uses spaces, as shown in FIG. 2. A high-speed data stream is divided into parallel data streams for simultaneous transmission, and at this point the transmitted data of each antenna are different, and are spatially demodulated and multiplexed and re-combined into a high-speed serial data stream at a receiving end. Using this method, transmission rate and throughput of the system can be greatly increased.

Since the wireless channel changes in real time, at some moments, the diversity STC can be used to get a better channel gain and improve the reliability of link transmission; while at other moments, the SM technology can be used to improve the channel transmission rate, thereby improving channel throughput. Using either the STC technology or the SM technology cannot maximally use the limited frequency band resources.

The Adaptive Modulation and Coding (AMC) is a selectively link adaptation method in the wireless communication technology. The AMC provides mobility to cooperate with the modulation and coding mode to make each user achieve an average channel condition. The downlink AMC is usually implemented in the case where the non-MIMO mode or the MIMO mode is the STC mode. The AMC alone may also be used to improve the system throughput. When both the AMC and the MIMO are used, if the AMC is adjusted separately, the case where the data transmission is unstable or the throughput cannot achieve an optimal condition may occur.

A MIMO mode fed back by a terminal means that a terminal estimates downlink channel quality based on downlink information, chooses a MIMO mode which is believed to be suitable, and feeds this MIMO mode information back to a base station via an uplink. The base station may select a MIMO mode to be used based on the MIMO mode proposed by the terminal. In other words, the MIMO mode fed back by the terminal can be used as a basis to determine channel conditions.

Switching of the downlink AMC and that of the MIMO in existing systems are carried out separately, adjustment of one of the downlink AMC and the MIMO do not consider whether the other is adjusted and whether the adjustment has effect on system stability. Facing the same channel condition (for example, a CINR (Carrier to Interference plus Noise Ratio) value is invariant), there are only two choices when the AMC and the MIMO are adjusted separately: the STC mode and the SM mode under the current DIUC (Downlink Interval Usage Code) value are used. When the STC mode under the current DIUC is used, link reliability is guaranteed, but traffic cannot be increased; when the SM mode under the current DIUC is used, the traffic is theoretically increased, but the link reliability cannot be guaranteed.

CONTENT OF THE INVENTION

A technical problem to be solved by the present invention is to provide a method and a base station for adjusting downlink AMC and MIMO modes so as to increase the traffic and guarantee the link reliability.

In order to solve the problem, the present invention provides a method for adjusting downlink Adaptive Modulation and Coding (AMC) and Multiple Input and Multiple Output (MIMO) modes comprising:

a base station determining the current maximum available Downlink Interval Usage Code (DIUC) using a downlink Carrier to Interference plus Noise Ratio (CINR) fed back by a terminal, using a MIMO mode fed back by the terminal to determine the current channel condition, and jointly adjusting the current MIMO mode and the DIUC of the terminal within the maximum available DIUC range according to the current channel condition.

The method may also have the following feature:

the step of jointly adjusting the current MIMO mode and the DIUC of the terminal within the maximum available DIUC range comprises:

when a DIUC currently used by the terminal is greater than the maximum available DIUC, adjusting the DIUC currently used by the terminal to the maximum available DIUC, and adjusting the current MIMO mode of the terminal to a space time coding (STC) mode.

The method may also have the following feature:

the step of jointly adjusting the current MIMO mode and the DIUC of the terminal within the maximum available DIUC range comprises:

when the DIUC currently used by the terminal is less than or equal to the maximum available DIUC, the terminal is currently in the STC mode, and the MIMO mode fed back by the terminal is a Spatial Multiplexing (SM) mode, switching the current MIMO mode of the terminal to the SM mode, while remaining the currently used DIUC unchanged.

The method may also have the following feature:

the step of jointly adjusting the current MIMO mode and the DIUC of the terminal within the maximum available DIUC range comprises:

when the DIUC currently used by the terminal is less than the maximum available DIUC, the terminal is currently in the STC mode, and the MIMO mode fed back by the terminal is also the STC mode, the base station adjusting the DIUC currently used by the terminal to the maximum available DIUC, while remaining the current MIMO mode unchanged.

The method may also have the following feature:

a joint adjustment table is configured in the base station, and DIUCs, MIMO modes, and corresponding quantities of bytes transmitted in each time slot when both are used in combination are stored in the joint adjustment table, and the DIUCs and the MIMO modes are arranged in a descending or ascending order of the quantities of the bytes;

according to the current channel condition, in the step of jointly adjusting the current MIMO mode and the DIUC of the terminal within the maximum available DIUC range comprises:

the joint adjustment table is used to adjust the current MIMO mode and the DIUC of the terminal in a direction of rate increasing or decreasing within the maximum available DIUC range according to the current channel condition.

The method may also have the following feature:

the step of adjusting the current MIMO mode and the DIUC of the terminal in the direction of rate increasing or decreasing within the maximum available DIUC range comprises:

when the DIUC currently used by the terminal is equal to the maximum available DIUC, the terminal is currently in the STC mode, and the MIMO mode fed back by the terminal is also the STC mode, the base station adjusting the currently used DIUC and the current MIMO mode of the terminal in the direction of rate increasing within the maximum available DIUC range by taking an entry in the joint adjustment table corresponding to the current MIMO mode and the currently used DICU as a basis.

The method may also have the following feature:

the step of adjusting the current MIMO mode and the DIUC of the terminal in the direction of rate increasing or decreasing within the maximum available DIUC range comprises:

when the DIUC currently used by the terminal is less than the maximum available DIUC, the terminal is currently in the SM mode and the MIMO mode fed back by the terminal is also the SM mode, the base station adjusting the currently used DIUC and the current MIMO mode of the terminal in the direction of rate increasing within the maximum available DIUC range by taking an entry in the joint adjustment table corresponding to the current MIMO mode and the currently used DICU as a basis.

The method may also have the following feature:

the step of adjusting the current MIMO mode and the DIUC of the terminal in the direction of rate increasing or decreasing within the maximum available DIUC range comprises:

when the DIUC currently used by the terminal is less than or equals to the maximum available DIUC, the terminal is currently in the SM mode, and the MIMO mode fed back by the terminal is also the SM mode, the base station adjusting the currently used DIUC and the current MIMO mode of the terminal in the direction of rate decreasing within the maximum available DIUC range by taking an entry in the joint adjustment table corresponding to the current MIMO mode and the currently used DICU currently as a basis.

The method may also have the following feature:

a statistical cycle, a first threshold and a second threshold are configured in the base station;

in the step of using the MIMO mode fed back by the terminal to determine the current channel condition, when the statistical cycle is reached, the base station counts the times of the terminal feeding back the STC mode and SM mode received in the statistical cycle;

the MIMO mode fed back by the terminal being the STC mode means that a ratio of the times of the terminal feeding back the STC mode to the total times of the terminal feeding back the MIMO mode received by the base station in the statistical cycle is greater than the first threshold; and the MIMO mode fed back by the terminal being the SM mode means that a ratio of the times of the terminal feeding back the SM mode to the total times of the terminal feeding back the MIMO mode received by the base station in the statistical cycle is greater than the second threshold.

The method may also have the following feature:

after the step of jointing adjusting the MIMO mode and the DIUC of the terminal, the methods further comprises: clearing the times of the terminal feeding back the STC mode and the SM mode fed back by the terminal counted in the statistical cycle.

In order to solve the aforementioned problem, the present invention also provides a base station for adjusting downlink Adaptive Modulation and Coding (AMC) and Multiple Input and Multiple Output (MIMO) modes comprising an AMC module, a fast feedback module and a joint adjustment module; wherein the AMC module is configured to use a downlink Carrier to Interference plus Noise Ratio (CINR) fed back by a terminal to determine the current maximum available Downlink Interval Usage Code (DIUC), and send the maximum available downlink interval usage code (DIUC) to the joint adjustment module;

the fast feedback module is configured to send the received MIMO mode fed back by the terminal to the joint adjustment module; and the joint adjustment module is configured to determine the current channel condition based on the received MIMO mode, and jointly adjust the current MIMO mode and the DIUC of the terminal within the maximum available DIUC range according to the current channel condition.

The base station may also have the following feature:

the joint adjustment module is configured to:

when determining that the DIUC currently used by the terminal is greater than the maximum available DIUC, adjust the DIUC currently used by the terminal to the maximum available DIUC, and adjust the current MIMO mode of the terminal to a space time coding (STC) mode; and/or when determining that the DIUC currently used by the terminal is less than or equals to the maximum available DIUC, the terminal is currently in the STC mode, and the MIMO mode fed back by the terminal is a Spatial Multiplexing (SM) mode, switch the MIMO mode currently used by the terminal to the SM mode, while remaining the currently used DIUC unchanged; and/or when determine that the DIUC currently used by the terminal is less than the maximum available DIUC, the terminal is currently in the STC mode, and the MIMO mode fed back by the terminal is also the STC mode, adjust the DIUC currently used by the terminal to the maximum available DIUC, while remaining the current MIMO mode unchanged.

The base station may also comprise a memory module;

a joint adjustment table is stored in the memory module, and DIUCs, MIMO modes, and corresponding quantities of bytes transmitted in each time slot when both are used in combination are stored in the joint adjustment table, and the DIUCs and the MIMO modes are arranged in a descending or ascending order of the quantities of the bytes;

the joint adjustment module is configured to: when determining that the DIUC currently used by the terminal is equal to the maximum available DIUC, the terminal is currently in the STC mode, and the MIMO mode fed back by the terminal is also the STC mode, adjust the currently used DIUC and the current MIMO mode of the terminal in a direction of rate increasing within the maximum available DIUC range by taking an entry in the joint adjustment table corresponding to the current MIMO mode and the currently used DICU as a basis; and/or when determining that the DIUC currently used by the terminal is less than the maximum available DIUC, the terminal is currently in the SM mode, and the MIMO mode fed back by the terminal is also the SM mode, adjust the currently used DIUC and the current MIMO mode of the terminal in a direction of rate increasing within the maximum available DIUC range by taking an entry in the joint adjustment table corresponding to the current MIMO mode and the currently used DICU as a basis; and/or when the DIUC currently used by the terminal is less than or equals to the maximum available DIUC, the terminal is currently in the SM mode, and the MIMO mode fed back by the terminal is also the SM mode, adjust the currently used DIUC and the current MIMO mode of the terminal in a direction of rate decreasing within the maximum available DIUC range by taking an entry in the joint adjustment table corresponding to the current MIMO mode and the currently used DICU as a basis.

Using the present invention, the shortcoming of adjusting the MIMO modes or the DIUCs separately can be overcome, and more combinations of the MIMO modes and the DIUCs are provided to maximize the spectral utilization and data transmission rate, so as to achieve ultimately the purpose of improving the link reliability and system throughput.

PREFERRED EMBODIMENTS OF THE PRESENT INVENTION

Figure 1:
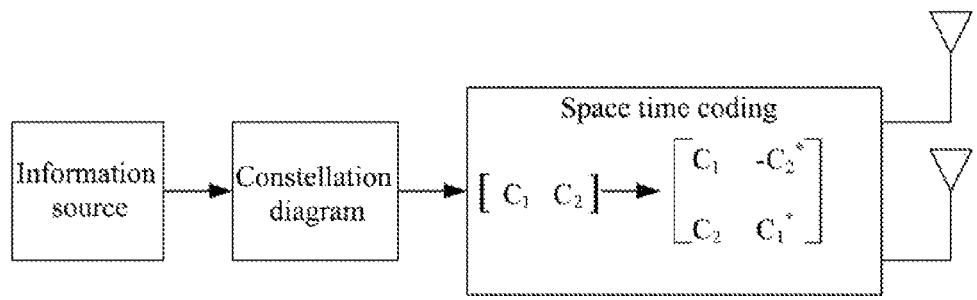
FIG. 1 is a schematic diagram of a STC in the prior art.
Figure 2:
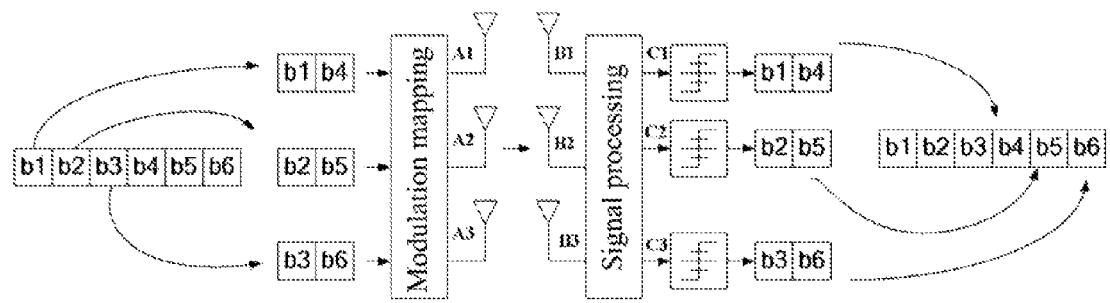
FIG. 2 is a schematic diagram of a SM in the prior art.

The technical scheme of the present invention will be described in more detail in conjunction with the accompanying figures and the embodiments.

The basic idea of the present invention is that a base station uses a downlink CINR fed back by a terminal to determine the current maximum available DIUC, uses a MIMO mode fed back by a terminal to determine the current channel condition, and jointly adjusts the current MIMO mode and the DIUC of the terminal within the maximum available DIUC range according to the current channel condition, and improves the channel throughput and/or the link reliability of the terminal.

The present invention describes a method for adaptively and jointly adjusting downlink MIMO modes and downlink modulation and coding mode DIUC using MIMO mode information fed back by a terminal so as to solve the problem that a base station adaptively uses an optimal MIMO mode as well as a modulation and coding mode based on real-time channel information for different users.

In the present invention, the MIMO mode information fed back by the terminal is used as a basis for determining channel quality, and based on which, the downlink MIMO mode and the downlink coding mode are adjusted. An idea of the adjustment is that in the case where both the modulation and coding mode and the MIMO mode are fixed, the quantity of bytes in each time slot is also fixed and can be considered as a rate by default, so different modulation and coding modes and MIMO modes can be combined and arranged according to the order of magnitudes of rates, and adjusted within the available DIUC range during the joint adjustment according to the order in a table described as follows:

TABLE 1

Joint Adjustment Table

| Downlink modulation and coding mode DIUC | MIMO mode | Rate |
|---|---|---|
| DIUC1 | MIMO1 | V1 |
| DIUC2 | MIMO2 | V2 |
| DIUC3 | MIMO3 | V3 |
| . . . | . . . | . . . |

In the table, $V1<V2<V3$ . . . , that is, the rates increase gradually. Moreover, a combination of a DIUC and a MIMO mode in each entry is different from those in other entries. Arranging the entries in the ascending order of rates is taken into account based on increase of throughput, increase of the rate may be exhibited as the increase of the throughput. Therefore, from the lowest-order STC mode, after it is determined that data transmission is stable, gradually increasing the throughput is considered, that is, either the DIUC or MIMO mode is adjusted, which is consistent with the idea of increasing the throughput on the basis of ensuring system stability preferentially. In the case of different combinations and the same rate, the combination in which the MIMO mode is the STC mode is selected preferentially within the available DIUC range to ensure the reliability of link transmission as much as possible.

A system for jointly adjusting downlink AMC and MIMO modes in accordance with the present invention requires that a base station should have at least two transmitting antennas and at least one user, each user having at least two receiving antennas.

The system at least comprises several components which will be described below. An AMC module is configured to determine the current maximum available DIUC. The AMC module determines the current maximum available DIUC based on the current CINR information fed back by the terminal, and notify a joint adjustment module of the current maximum available DIUC. Because the AMC module stores a corresponding relationship between a CINR range and a modulation and coding mode (for example, when the CINR is between 15 and 18, the modulation and coding mode is selected as quadrature phase shift keying (QPSK) (Cyclic Redundancy Check (CTC)) 3/4, and when the CINR is between 25 and 28, the modulation and coding mode is selected as 64 Quadrature Amplitude Modification (QAM) (CTC) 3/4, etc.), when a CINR fed back by the terminal is received, the AMC module determines the corresponding modulation and coding mode based on a range where the CINR is located, and uses the value of the modulation and coding mode as the current maximum available DIUC. A fast feedback module is configured to notify the joint adjustment module of MIMO mode information fed back by the terminal. The fast feedback module plays a role of an intermediate bridge, and its main function is to send the MIMO mode information fed back by the terminal to the joint adjustment module. The joint adjustment module is configured to adaptively adjust MIMO modes and downlink modulation and coding mode DIUCs. The joint adjustment module determines a real-time channel condition based on the MIMO mode information fed back by the terminal and sent by the fast feedback module, while jointly adjusting the currently used MIMO mode and the DIUC in conjunction with the maximum available DIUC reference value fed back by the AMC module.

Steps for implementing the system for jointly adjusting downlink AMC and MIMO modes in accordance with the present invention will be described below.

1. The current maximum available DIUC is determined. An AMC judgment mechanism is used to determine the current maximum available DIUC. The original AMC judgment mechanism determines the current maximum available DIUC based on a CINR in a non-MIMO mode. However, theoretically, there is 3 dB gain when a STC mode is used rather than when the non-MIMO mode is used. Thus at this point it can be ensured that the STC mode of the current maximum available DIUC is available, but it cannot be ensured that the STC mode higher than the current maximum available DIUC is also available. Therefore, it is required to be determined whether the currently used DIUC is greater than the current maximum available DIUC or not, and if yes, the STC mode of the current maximum available DIUC is entered to ensure the system stability.

2. A statistical cycle T is designed in order to determine more accurately the real-time channel condition. In this cycle, the times of the terminal feeding back the STC mode and SM mode are counted, and the real-time channel condition is determined based on a ratio of the times of feeding back the STC mode or the SM mode to the total feedback times.

Figure 3:
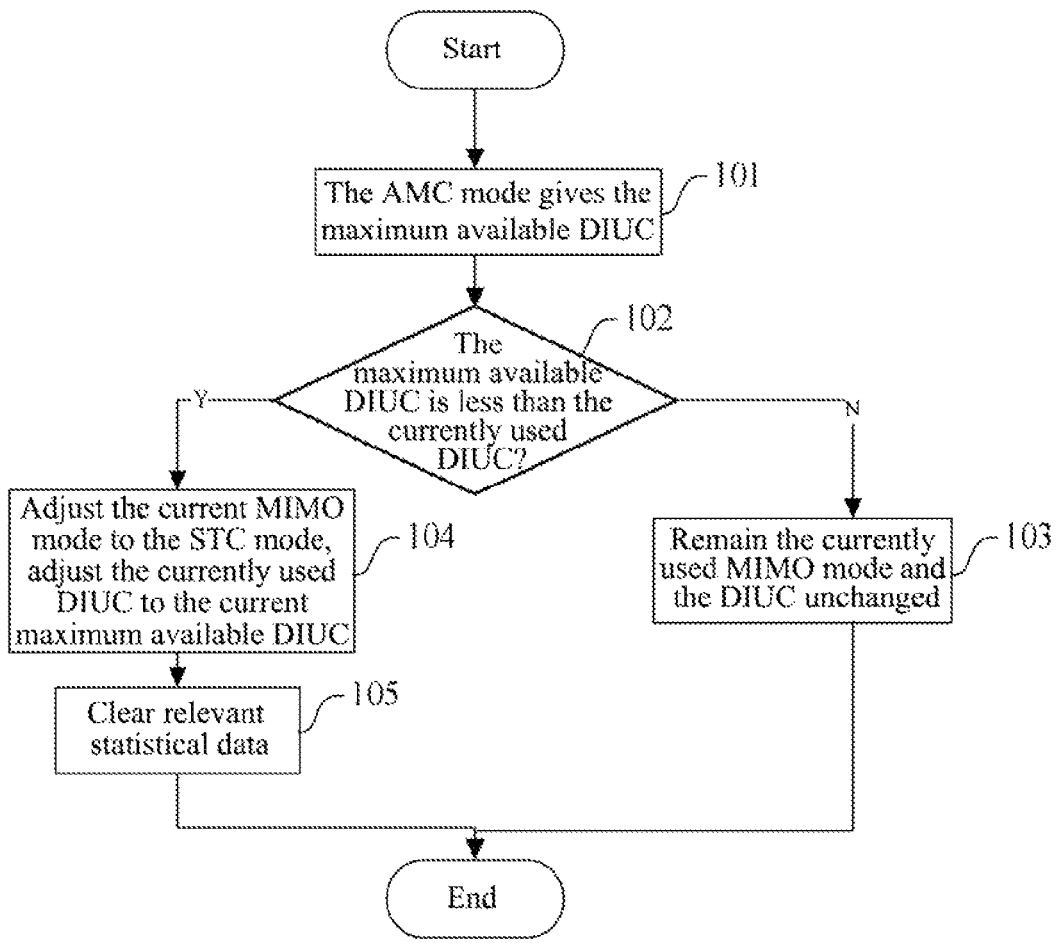
FIG. 3 is a flow chart of a process of DIUC updating in accordance with an embodiment of the present invention.

3. DIUC updating. As the maximum available DIUC given by the AMC changes, the DIUC used by the joint adjustment module needs to be updated accordingly. As shown in FIG. 3, the update process will be described now. Step 101, the AMC mode gives the maximum available DIUC. Step 102, it is determined whether the maximum available DIUC is less than the currently used DIUC or not, if the maximum available DIUC given by the AMC is greater than or equal to the currently used DIUC, step 103 is performed; if the maximum available DIUC given by the AMC is less than the currently used DIUC, step 104 is performed. Step 103, the stored maximum available DIUC is updated without other processing, and the process ends. Step 104, the current MIMO mode is adjusted directly to a STC mode, the currently used DIUC is adjusted to the current maximum available DIUC given by the AMC. Step 105, relevant statistical data is cleared. The DIUC and the MIMO mode are adjusted, because when the modulation and coding mode determined by the AMC based on the CINR is lower than the currently used modulation and coding mode, it is indicated that the current channel condition cannot guarantee transmission stability if the currently used modulation and coding mode continues to be used. Thus the modulation and coding mode newly determined by the AMC is adjusted to, meanwhile, the STC mode is used so as to guarantee the stability of data transmission. Relevant statistic data comprises information, such as the times of the terminal reporting MIMO mode, wherein the times of the terminal reporting the MIMO mode further comprises the times of the terminal reporting the STC mode and the times of the terminal reporting the SM mode. Because the update process of the DIUCs and a judgment process of the joint adjustment module described below are performed in parallel, the two processes may adjust jointly both the MIMO mode and the DIUC of the terminal. After the MIMO mode and the DIUC are adjusted in the update process of the DIUCs, the statistical data previously acquired by the joint adjustment module will have no sense. Thus the data is required to be cleared and recounted on the basis of the new MIMO mode and the DIUC.

4. The joint adjustment module adjusts the downlink MIMO mode and the DIUC. Since different modulation and coding modes have different channel requirements for the SM mode, in order to make the adjustment of the MIMO mode and the DIUC more reasonable, the joint adjustment module jointly determines the MIMO mode and the DIUC based on MIMO mode information fed back by the terminal in conjunction with the comparison result of the maximum available DIUC given by the AMC with the currently used DIUC. Three cases will be described below.

1) The first case where the current maximum available DIUC given by the AMC is greater than the currently used DIUC will be described now. When the currently used MIMO mode is the STC mode, if a ratio of the times of the terminal feeding back the STC mode in the statistical cycle T to the total feedback times is m % greater than the first threshold, the current MIMO mode is remained unchanged, and the current DIUC is adjusted to the current maximum available DIUC. If a ratio of the times of the terminal feeding back the SM mode to the total feedback times is n % greater than the second threshold, the current DIUC is remained unchanged, and the MIMO mode is adjusted directly to the SM mode. When the currently used MIMO mode is the SM mode, if the ratio of the times of the terminal feeding back the STC mode to the total feedback times in the statistical cycle T is greater than m %, the current MIMO mode and the DIUC are used as references, and the MIMO mode and the DIUC are adjusted in the direction of rate decreasing within the current maximum available DIUC range according to a joint adjustment table. If the ratio of the times of the terminal feeding back the SM mode to the total feedback times is n % greater than the second threshold, the current MIMO mode and the DIUC as are used as references, and the MIMO mode and the DIUC are adjusted in the direction of rate increasing within the current maximum available DIUC range according to the joint adjustment table. In other cases, the current MIMO mode and the DIUC are remained unchanged.

2) The second case where the current maximum available DIUC given by the AMC is equal to the currently used DIUC will be described now. When the currently used MIMO mode is the STC mode, if the ratio of the times of the terminal feeding back the STC mode to the total feedback times in the statistical cycle T is greater than m %, the current MIMO mode and the DIUC are used as references, and the MIMO mode and the DIUC are adjusted in the direction of rate increasing within the current maximum available DIUC range according to the joint adjustment table. If the ratio of the times of the terminal feeding back the SM mode to the total feedback times is greater than n %, the current DIUC is remained changed, and the MIMO mode is adjusted directly the SM mode. In the case that the currently used MIMO mode is the SM mode, if the ratio of the times of the terminal feeding back the STC mode to the total feedback times in the statistical cycle T is greater than m %, the current MIMO mode and the DIUC are used as references, and the MIMO mode and the DIUC are adjusted in the direction of rate decreasing within the current maximum available DIUC range according to the joint adjustment table. In other cases, the current MIMO mode and the DIUC are remained unchanged.

3) The third case where the current maximum available DIUC given by the AMC is less than the currently used DIUC will be described now. At this moment, the MIMO mode is adjusted directly to the STC mode, and the currently used DIUC is adjusted to the current maximum available DIUC.

Figure 4:
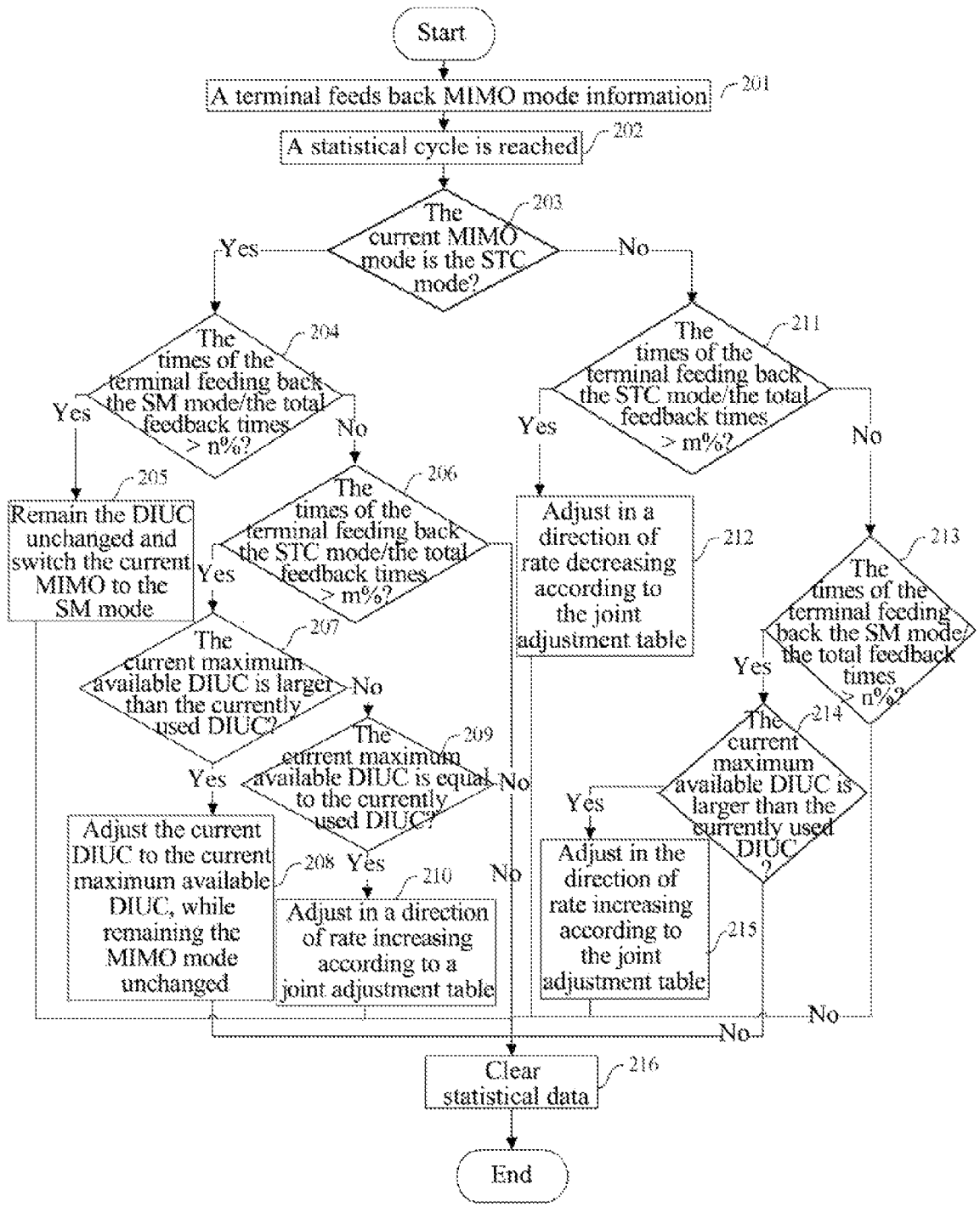
FIG. 4 is a flow chart of a process of jointly adjusting AMC based on a MIMO mode fed back by the terminal and the MIMO mode in accordance with an embodiment of the present invention.

Summarize the above three cases, it can be seen that, the process in 3) is the same as the update process of the DIUC, so parts of the process in 1) and 2) are the same. Therefore, the current maximum available DIUC given by the AMC is not required to be compared with the currently used DIUC. Therefore, the following processing method is eventually obtained, as shown in FIG. 4, the method comprises the following steps. Step 201, a joint adjustment module acquires MIMO mode information fed back by a terminal. Step 202, when a statistical cycle is reached, the current MIMO mode is determined. Step 203, it is determined whether the current MIMO mode is the STC mode or not, and if yes, step 204 is performed, otherwise step 211 is performed. Step 204, it is determined whether the ratio of the times of the terminal feeding back the SM mode to the total feedback times is greater than n % or not, and if yes, step 205 is performed, otherwise step 206 is performed. Step 205, the current MIMO is directly switched to the SM mode, and the DIUC is remained unchanged, step 216 is performed. Step 206, it is determined whether the ratio of the terminal feeding back the STC mode to the total feedback times is greater than m % or not, and if yes, step 207 is performed, otherwise step 216 is performed. Step 207, the current maximum available DIUC given by the AMC is compared with the currently used DIUC, when the current maximum available DIUC given by the AMC is greater than the currently used DIUC, step 208 is performed, otherwise step 209 is performed. Step 208, the current DIUC is directly adjusted to the current maximum available DIUC, and the MIMO mode is remained unchanged, step 216 is performed. Step 209, it is determined whether the current maximum available DIUC given by the AMC is equal to the currently used DIUC, and if yes, step 210 is performed, otherwise step 216 is performed. Step 210, the current MIMO mode and the DIUC are used as references, and the MIMO mode and the DIUC is adjusted in the direction of rate increasing within the current maximum available DIUC range according to the joint adjustment table, step 216 is performed.

Step 211, It is determined whether the ratio of the times of the terminal feeding back the STC mode to the total feedback times is large than m % or not, and if yes, step 212 is performed, otherwise step 213 is performed. Step 212, the current MIMO mode and the DIUC are used as references, and the MIMO mode and the DIUC are adjusted in the direction of rate decreasing within the current maximum available DIUC range according to the joint adjustment table, step 216 is performed. Step 213, it is determined whether the ratio of the times of the terminal feeding back the SM mode to the total feedback times is greater than n % or not, and if yes, step 214 is performed, otherwise step 216 is performed. Step 214, it is determined whether the current maximum available DIUC given by the AMC is greater than the currently used DIUC or not, and if yes, step 215 is performed, otherwise step 216 is performed. Step 215, the current MIMO mode and the DIUC are used as references, and the MIMO mode and the DIUC are adjusted in the direction of rate increasing within the current maximum available DIUC range according to the joint adjustment table. In other cases, the MIMO mode and the DIUC are remained unchanged, step 216 is performed.

Step 216: The statistical data is cleared.

Taking a single user as example, the basic implementation steps of the present invention are described in conjunction with FIG. 3 and FIG. 4.

In the first step, a base station acquires the current maximum available DIUC based on a downlink CINR reported by a terminal, and determines whether the currently used DIUC is greater than the current maximum available DIUC or not, and if yes, for this user, switches the MIMO mode used by the base station to the STC mode of the current maximum available DIUC to ensure system stability, otherwise remains the MIMO mode unchanged.

In the second step, the base station receives MIMO mode information fed back by the user.

In the third step, in a statistical cycle, the base station counts the times of the user feeding back the STC mode and the SM mode. When the statistical cycle is reached, the base station performs the following adjustment. The base station first determines the current MIMO mode. If the current MIMO mode is the STC mode, if the ratio of the times of the terminal feeding back the SM mode to the total feedback times is greater than n %, the current MIMO mode is directly switched to the SM mode, the base station remains the DIUC unchanged. If the ratio of the times of the terminal feeding back the STC mode to the total feedback times is greater than m %, the base station compares the current maximum available DIUC given by the AMC with the currently used DIUC. When the current maximum available DIUC given by the AMC is greater than the currently used DIUC, the base station adjusts directly the current DIUC to the current maximum available DIUC, remains the MIMO mode unchanged. When the current maximum available DIUC given by the AMC is equal to the currently used DIUC, the base station uses the current MIMO mode and the DIUC as references, and adjusts the current MIMO mode and the DIUC in the direction of rate increasing within the current maximum available DIUC range according to a joint adjustment table. If the current MIMO mode is the SM mode, if the ratio of the times of the terminal feeding back the STC mode to the total feedback times is greater than m %, the base station uses the current MIMO mode and the DIUC as references, and adjusts the current MIMO mode and the DIUC in the direction of rate decreasing within the current maximum available DIUC range according to the joint adjustment table. If the ratio of the times of the terminal feeding back the SM mode to the total feedback times is greater than n %, the base station compares the current maximum available DIUC given by the AMC with the currently used DIUC. When the current maximum available DIUC given by the AMC is greater than the currently used DIUC, the base station uses the current MIMO mode and the DIUC as references, and adjusts the MIMO mode and the DIUC in the direction of rate increasing within the current maximum available DIUC range according to the joint adjustment table. In other cases, the base station remains the MIMO mode and the DIUC unchanged. After the adjustment, the base station clears relevant statistical data.

In the fourth step, if the MIMO mode information fed back by the user does not achieve a switching condition when the switching adjustment cycle ends, for this user, the base station remains the current MIMO mode and the DIUC unchanged, clears the relevant statistical data, and enters into the next statistical cycle.

A multi-user operating process is similar to the single-user operating process, and will not repeated here.

For better description, Table 1 is instantiated and compared with the case where the AMC and the MIMO are adjusted separately.

TABLE 2

Example of the Joint Adjustment Table

| Downlink Modulation and Coding mode DIUC | MIMO Mode | The quantity of bytes in each slot (rate by default) |
|---|---|---|
| QPSK (CTC) ½ | STC | 6 |
| QPSK (CTC) ¾ | STC | 9 |
| QPSK (CTC) ½ | SM | 12 |
| 16QAM (CTC) ½ | STC | 12 |
| QPSK (CTC) ¾ | SM | 18 |
| 16QAM (CTC) ¾ | STC | 18 |
| 64QAM (CTC) ½ | STC | 18 |
| 16QAM (CTC) ½ | SM | 24 |
| 64QAM (CTC) ⅔ | STC | 24 |
| 64QAM (CTC) ¾ | STC | 27 |
| 64QAM (CTC) ⅚ | STC | 30 |
| 16QAM (CTC) ¾ | SM | 36 |
| 64QAM (CTC) ½ | SM | 36 |
| 64QAM (CTC) ⅔ | SM | 48 |
| 64QAM (CTC) ¾ | SM | 54 |
| 64QAM (CTC) ⅚ | SM | 60 |

It can be seen from this table that this table combines MIMO modes and DIUCs based on magnitudes of rates, thus during the adjustment, both stability of link transmission and increase of system throughput are considered. By comparing this method with the method where the AMC and the MIMO mode are adjusted separately, beneficial effects of using the joint adjustment method can be seen and will be described below.

1. Suppose that the current channel condition is good, download is smooth when the 16QAM (CTC) 1/2 SM mode is used, at this time, either method can be used to adjust the MIMO mode as well as the DIUC to the 16QAM (CTC) 1/2 SM.

2. Suppose that the current channel conditions are not good, although the CINR value fed back by the terminal is remained unchanged, the maximum available DIUC can still use 16QAM (CTC) 1/2, but only the STC mode can be used when the DIUC is 16QAM (CTC) 1/2. So if the method for separately adjusting the AMC and the MIMO is used, the rate can only reach 12 if the 16QAM (CTC) 1/2 STC mode is used, or the 16QAM (CTC) 1/2 SM mode is forced to be used, although the maximum rate theoretically can reach 24. Due to poor channel conditions, not only the reliability of link transmission will be affected but also the actual rate cannot use the STC mode. However, if the joint adjustment method is used, in the case that the available DIUC is less than the maximum available DIUC 16QAM (CTC) 1/2, the QPSK (CTC) 3/4 SM mode may be chosen by looking up the table. At this time, the rate can reach 18, which can not only ensure the reliability of link transmission but also to maximize system throughput.

It may be understood by those skilled in the art that some or all steps in the abovementioned method can be fulfilled by instructing relevant hardware components using programs. The programs are stored in a computer readable storage media, such as read only memory, magnetic disk or optical disk. Optionally, some or all steps in the embodiment can be implemented using one or more integrated circuits. Accordingly, each module/unit in the embodiment can be implemented in the form of hardware or in the form of software function module, or a combination thereof. Of course, the present invention may have a variety of other embodiments. Various corresponding modifications and variations to the present invention may be made by those skilled in the art without departing from the spirit and essence of the present invention. All these modification or variations should belong to the protection scope of the claims of the present invention.

Industrial Applicability

A method and a base station for jointly adjusting downlink Adaptive Modification and Coding (AMC) and Multiple Input and Multiple Output (MIMO) modes in accordance with the present invention overcome the shortcoming of separately adjusting the MIMO mode or the DIUC, and provide more combinations of the MIMO mode and the DIUC to maximize the spectral utilization and data transmission rate, thus ultimately achieving the purpose of improving the link reliability and the system throughput.

What is claimed is:

1. A method for adjusting downlink Adaptive Modulation and Coding (AMC) and Multiple Input and Multiple Output (MIMO) modes comprising:

a base station determining a current maximum available Downlink Interval Usage Code (DIUC) using a downlink Carrier to Interference plus Noise Ratio (CINR) fed back by a terminal, using a MIMO mode fed back by the terminal to determine a current channel condition, and jointly adjusting a current MIMO mode and a the DIUC of the terminal within a maximum available DIUC range according to the current channel condition; wherein the step of jointly adjusting the current MIMO mode and the DIUC of the terminal within the maximum available DIUC range comprises:

when a DIUC currently used by the terminal is greater than the maximum available DIUC, adjusting the DIUC currently used by the terminal to the maximum available DIUC, and adjusting the current MIMO mode of the terminal to a Space Time Coding (STC) mode;

when the DIUC currently used by the terminal is less than or equal to the maximum available DIUC, the terminal is currently in the STC mode, and the MIMO mode fed back by the terminal is a spatial multiplexing (SM) mode, switching the current MIMO mode of the terminal to the SM mode, while remaining the currently used DIUC unchanged;

when the DIUC currently used by the terminal is less than the maximum available DIUC, the terminal is currently in the STC mode, and the MIMO mode fed back by the terminal is also the STC mode, the base station adjusting the DIUC currently used by the terminal to the maximum available DIUC, while remaining the current MIMO mode unchanged.

2. The method according to claim 1, wherein:

a joint adjustment table is configured in the base station, and DIUCs, MIMO modes, and corresponding quantities of bytes transmitted in each time slot when both of a DIUC and a MIMO mode are used in combination are stored in the joint adjustment table, and the DIUCs and the MIMO modes are arranged in a descending or ascending order of the quantities of the bytes;

according to the current channel condition, in the step of jointly adjusting the current MIMO mode and the DIUC of the terminal within the maximum available DIUC range, the joint adjustment table is used to adjust the current MIMO mode and the DIUC of the terminal in a direction of rate increasing or decreasing within the maximum available DIUC range according to the current channel condition.

3. The method according to claim 2, wherein:
the step of adjusting the current MIMO mode and the DIUC of the terminal in the direction of rate increasing or decreasing within the maximum available DIUC range comprises:
when the DIUC currently used by the terminal is equal to the maximum available DIUC, the terminal is currently in the STC mode, and the MIMO mode fed back by the terminal is also the STC mode, the base station adjusting the currently used DIUC and the current MIMO mode of the terminal in the direction of rate increasing within the maximum available DIUC range by taking an entry in the joint adjustment table corresponding to the current MIMO mode and the currently used DICU as a basis.

4. The method according to claim 3, wherein:
a statistical cycle, a first threshold and a second threshold are configured in the base station;
in the step of using the MIMO mode fed back by the terminal to determine the current channel condition,
when the statistical cycle is reached, the base station counts the times of the terminal feeding back the STC mode and the times of the terminal feeding back the SM mode received in the statistical cycle;
the MIMO mode fed back by the terminal being the STC mode means that a ratio of the times of the terminal feeding back the STC mode received by the base station in the statistical cycle to the total times of the terminal feeding back the MIMO mode received by the base station in the statistical cycle is greater than the first threshold; and
the MIMO mode fed back by the terminal being the SM mode means that a ratio of the times of the terminal feeding back the SM mode received by the base station in the statistical cycle to the total times of the terminal feeding back the MIMO mode received by the base station in the statistical cycle is greater than the second threshold.

5. The method according to claim 2, wherein:
the step of adjusting the current MIMO mode and the DIUC of the terminal in the direction of rate increasing or decreasing within the maximum available DIUC range comprises:
when the DIUC currently used by the terminal is less than the maximum available DIUC, the terminal is currently in the SM mode and the MIMO mode fed back by the terminal is also the SM mode, the base station adjusting the currently used DIUC and the current MIMO mode of the terminal in the direction of rate increasing within the maximum available DIUC range by taking an entry in the joint adjustment table corresponding to the current MIMO mode and the currently used DICU as a basis.

6. The method according to claim 5, wherein:
a statistical cycle, a first threshold and a second threshold are configured in the base station;
in the step of using the MIMO mode fed back by the terminal to determine the current channel condition,
when the statistical cycle is reached, the base station counts the times of the terminal feeding back the STC mode and the times of the terminal feeding back the SM mode received in the statistical cycle;
the MIMO mode fed back by the terminal being the STC mode means that a ratio of the times of the terminal feeding back the STC mode received by the base station in the statistical cycle to the total times of the terminal feeding back the MIMO mode received by the base station in the statistical cycle is greater than the first threshold; and
the MIMO mode fed back by the terminal being the SM mode means that a ratio of the times of the terminal feeding back the SM mode received by the base station in the statistical cycle to the total times of the terminal feeding back the MIMO mode received by the base station in the statistical cycle is greater than the second threshold.

7. The method according to claim 2, wherein:
the step of adjusting the current MIMO mode and the DIUC of the terminal in the direction of rate increasing or decreasing within the maximum available DIUC range comprises:
when the DIUC currently used by the terminal is less than or equals to the maximum available DIUC, the terminal is currently in the SM mode, and the MIMO mode fed back by the terminal is the STC mode, the base station adjusting the currently used DIUC and the current MIMO mode of the terminal in the direction of rate decreasing within the maximum available DIUC range by taking an entry in the joint adjustment table corresponding to the current MIMO mode and the currently used DICU currently as a basis.

8. The method according to claim 7, wherein:
a statistical cycle, a first threshold and a second threshold are configured in the base station;
in the step of using the MIMO mode fed back by the terminal to determine the current channel condition,
when the statistical cycle is reached, the base station counts the times of the terminal feeding back the STC mode and the times of the terminal feeding back the SM mode received in the statistical cycle;
the MIMO mode fed back by the terminal being the STC mode means that a ratio of the times of the terminal feeding back the STC mode received by the base station in the statistical cycle to the total times of the terminal feeding back the MIMO mode received by the base station in the statistical cycle is greater than the first threshold; and
the MIMO mode fed back by the terminal being the SM mode means that a ratio of the times of the terminal feeding back the SM mode received by the base station in the statistical cycle to the total times of the terminal feeding back the MIMO mode received by the base station in the statistical cycle is greater than the second threshold.

9. The method according to claim 1, wherein:
a statistical cycle, a first threshold and a second threshold are configured in the base station;
in the step of using the MIMO mode fed back by the terminal to determine the current channel condition,
when the statistical cycle is reached, the base station counts the times of the terminal feeding back the STC mode and the times of the terminal feeding back the SM mode received in the statistical cycle;
the MIMO mode fed back by the terminal being the STC mode means that a ratio of the times of the terminal feeding back the STC mode received by the base station in the statistical cycle to the total times of the terminal feeding back the MIMO mode received by the base station in the statistical cycle is greater than the first threshold; and the MIMO mode fed back by the terminal being the SM mode means that a ratio of the times of the terminal feeding back the SM mode received by the base station in the statistical cycle to the total times of the terminal feeding back the MIMO mode received by the base station in the statistical cycle is greater than the second threshold.

10. The method according to claim 9, wherein:
after the step of jointing adjusting the MIMO mode and the DIUC of the terminal, the methods further comprises:
clearing the times of the terminal feeding back the STC mode and the times of the terminal feeding back the SM mode counted in the statistical cycle.

11. A base station for adjusting downlink Adaptive Modulation and Coding (AMC) and Multiple Input and Multiple Output (MIMO) modes comprising:
a processor; and
a storage device for storing processor executable instructions that when executed by the processor cause the processor to perform the steps in the following modules:
an AMC module, configured to use a downlink Carrier to Interference plus Noise Ratio (CINR) fed back by a terminal to determine a current maximum available Downlink Interval Usage Code (DIUC), and send the maximum available downlink interval usage code (DIUC) to the joint adjustment module;
a fast feedback module, configured to send a received MIMO mode fed back by the terminal to the joint adjustment module; and
a joint adjustment module, configured to determine a current channel condition based on the received MIMO mode, and jointly adjust a current MIMO mode and a DIUC of the terminal within a maximum available DIUC range according to the current channel condition; wherein
the joint adjustment module is configured to:
when determining that the DIUC currently used by the terminal is greater than the maximum available DIUC, adjust the DIUC currently used by the terminal to the maximum available DIUC, and adjust the current MIMO mode of the terminal to a space time coding (STC) mode;
when determining that the DIUC currently used by the terminal is less than or equals to the maximum available DIUC, the terminal is currently in the STC mode, and the MIMO mode fed back by the terminal is a spatial multiplexing (SM) mode, switch the MIMO mode currently used by the terminal to the SM mode, while remaining the currently used DIUC unchanged;
when determine that the DIUC currently used by the terminal is less than the maximum available DIUC, the terminal is currently in the STC mode, and the MIMO mode fed back by the terminal is also the STC mode, adjust the DIUC currently used by the terminal to the maximum available DIUC, while remaining the current MIMO mode unchanged.

12. The base station according to claim 11, further comprises a memory module, wherein:
a joint adjustment table is stored in the memory module, and DIUCs, MIMO modes, and corresponding quantities of bytes transmitted in each time slot when both of a DIUC and a MIMO mode are used in combination are stored in the joint adjustment table, and the DIUCs and the MIMO modes are arranged in a descending or ascending order of the quantities of the bytes;
the joint adjustment module is configured to: when determining that the DIUC currently used by the terminal is equal to the maximum available DIUC, the terminal is currently in the STC mode, and the MIMO mode fed back by the terminal is also the STC mode, adjust the currently used DIUC and the current MIMO mode of the terminal in a direction of rate increasing within the maximum available DIUC range by taking an entry in the joint adjustment table corresponding to the current MIMO mode and the currently used DICU as a basis;
when determining that the DIUC currently used by the terminal is less than the maximum available DIUC, the terminal is currently in the SM mode, and the MIMO mode fed back by the terminal is also the SM mode, adjust the currently used DIUC and the current MIMO mode of the terminal in a direction of rate increasing within the maximum available DIUC range by taking an entry in the joint adjustment table corresponding to the current MIMO mode and the currently used DICU as a basis;
when the DIUC currently used by the terminal is less than or equals to the maximum available DIUC, the terminal is currently in the SM mode, and the MIMO mode fed back by the terminal is the STC mode, adjust the currently used DIUC and the current MIMO mode of the terminal in a direction of rate decreasing within the maximum available DIUC range by taking an entry in the joint adjustment table corresponding to the current MIMO mode and the currently used DICU as a basis.

* * * * *